US010274388B2

(12) United States Patent
Sekiya et al.

(10) Patent No.: US 10,274,388 B2
(45) Date of Patent: Apr. 30, 2019

(54) PRESSURE SENSOR INCLUDING SENSOR MODULE HAVING DIAPHRAGM AND JOINT ATTACHED WITH THE SENSOR MODULE

(71) Applicant: NAGANO KEIKI CO., LTD., Tokyo (JP)

(72) Inventors: Haruhiko Sekiya, Tokyo (JP); Shuji Tohyama, Tokyo (JP); Nobuhiko Akimoto, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 99 days.

(21) Appl. No.: 15/474,204

(22) Filed: Mar. 30, 2017

(65) Prior Publication Data

US 2017/0292885 A1 Oct. 12, 2017

(30) Foreign Application Priority Data

Apr. 7, 2016 (JP) ................................. 2016-077072

(51) Int. Cl.
*G01L 9/00* (2006.01)
*G01L 19/14* (2006.01)
*G01L 19/00* (2006.01)

(52) U.S. Cl.
CPC ........ *G01L 9/0048* (2013.01); *G01L 19/0038* (2013.01); *G01L 19/145* (2013.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/0069; G01L 19/0618; G01L 19/0645; G01L 9/0052; G01L 9/0055; G01L 9/0073;

(Continued)

(56) References Cited

U.S. PATENT DOCUMENTS 5,939,637 A 8/1999 Pitzer et al.
2002/0100331 A1* 8/2002 Imai ..................... G01L 19/0069
73/753

(Continued)

FOREIGN PATENT DOCUMENTS

EP 1520639 4/2005
EP 2813830 12/2014

(Continued)

OTHER PUBLICATIONS

European Search Report dated Aug. 25, 2017, 9 pages.
Japanese Office Action with English translation dated Nov. 13, 2018, 6 pages.

*Primary Examiner* — Andre J Allen
(74) *Attorney, Agent, or Firm* — Rankin, Hill & Clark LLP

(57) ABSTRACT

A sensor module and a joint are made of different metal materials. The sensor module includes a first portion located near a diaphragm and a second portion having a large-diameter portion whose diameter is larger than that of the first portion. A step engaged with a peripheral edge of the large-diameter portion is formed on the joint. The large-diameter portion and the joint are mutually bonded through a bonding portion. The bonding portion is bonded by a plastic deformation bonding that is so-called metal flow. A space is defined between the joint and the module body.

5 Claims, 2 Drawing Sheets

(58) Field of Classification Search
CPC . G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04; G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/10; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

See application file for complete search history.

(56) References Cited

U.S. PATENT DOCUMENTS

2005/0072242 A1* 4/2005 Fandrey .............. G01L 19/0007
73/706
2016/0091377 A1* 3/2016 Tohyama .............. G01L 9/0051
73/720
2017/0153157 A1* 6/2017 Abe ....................... G01L 9/0041

FOREIGN PATENT DOCUMENTS

| JP | H11-173931 A | 7/1999 |
| JP | 2005-283253 A | 10/2005 |
| JP | 2008-157670 A | 7/2008 |
| JP | 4127532 | 7/2008 |
| WO | 2013/110045 | 7/2013 |

* cited by examiner

PRESSURE SENSOR INCLUDING SENSOR MODULE HAVING DIAPHRAGM AND JOINT ATTACHED WITH THE SENSOR MODULE

The entire disclosure of Japanese Patent Application No. 2016-077072 filed Apr. 7, 2016 is expressly incorporated by reference herein.

TECHNICAL FIELD

The present invention relates to a pressure sensor.

BACKGROUND ART

Some of pressure sensors include a joint, a sensor module attached to the joint, and a diaphragm provided on the sensor module and displaceable in accordance with a pressure of a fluid to be measured.

An example of the above pressure sensors include: a cylindrical member having a flange and a distal end closed by a diaphragm; and an attachment base having a counterbore for receiving the cylindrical member (Patent Literature 1: Japanese Patent Publication No. 4127532).

According to Patent Literature 1, the cylindrical member is inserted from an insertion hole of the attachment base and the flange is fitted into the counterbore. In this state, a pressurizing force in an axial direction is applied to the cylindrical member so that a coarse face at a distal end face of the flange bites into a bottom face of the attachment base. Further, a punch is lowered concentrically with the insertion hole of the attachment base for the cylindrical member. According to the above process, the attachment base and the cylindrical member are bonded by a plastic deformation bonding (so-called "metal flow"), so that an assembly process of the attachment base and the cylindrical member can be facilitated and air-tightness can be enhanced.

According to the typical example disclosed in Patent Literature 1, the cylindrical member is provided by a single member. When a pressure is applied to the cylindrical member toward the attachment base using a punch or the like in order to attach the attachment base and the cylindrical member to each other, the pressurizing force may be transmitted to the diaphragm to cause a strain on the diaphragm.

Since a detector is usually provided on the diaphragm, the detection accuracy of the detector is influenced by the assembly process.

SUMMARY OF THE INVENTION

An object of the invention is to provide a pressure sensor that exhibits enhanced air-tightness, is easy to be assembled, and causes less strain on the diaphragm when being assembled.

A pressure sensor according to an aspect of the invention includes: a sensor module comprising an open end through which a fluid to be measured is introduced, and a diaphragm displaceable in accordance with a pressure of the fluid to be measured introduced through the open end; and a joint attached with the sensor module and comprising an introduction port through which the fluid to be measured is introduced to the sensor module, in which the sensor module and the joint are made of different metal materials, the sensor module includes: a first portion located near the diaphragm; and a second portion located near the open end and comprising a large-diameter portion having a diameter larger than a diameter of the first portion, a step with which a peripheral edge of the large-diameter portion is engaged is provided to the joint, the large-diameter portion is bonded to the joint through a bonding portion, the bonding portion is formed between an outer circumferential portion of the large-diameter portion and the joint, where a part of the outer circumferential portion of the large-diameter portion and an inner circumferential portion of the joint bite into each other while causing a local plastic deformation and an elastic deformation pressure, and where the elastic deformation pressure in an axial direction is trapped at the bonding portion to keep a connection in the axial direction, and a space configured to prevent a stress caused on the joint when the joint and the large-diameter portion are bonded from being transmitted to the diaphragm is provided between the joint and the first portion.

In the above aspect of the invention, in order to attach the sensor module to the joint, the peripheral edge of the large-diameter portion is brought into contact with the step of the joint to position the sensor module. Then, a predetermined pressurizing force is applied to the sensor module and the joint using an appropriate device (e.g. a punch) to connect the joint to the large-diameter portion of the sensor module by a plastic deformation bonding.

The bonding portion formed on the joint and the large-diameter portion is produced by the plastic deformation bonding, which is so-called metal flow, where the joint and the sensor module are integrated to ensure air-tightness.

According to the above arrangement, since the sensor module and the joint are bonded using the metal flow, the air-tightness can be enhanced and the assembling process can be facilitated.

Further, since the space is defined between the joint and the first portion, a stress caused on the joint when the joint and the large-diameter portion are bonded is prevented from being transmitted to the diaphragm. Accordingly, less strain is caused on the diaphragm when the sensor module is bonded to the joint.

In the pressure sensor according to the above aspect of the invention, it is preferable that the bonding portion is disposed at a portion at which a radial compression force is generated due to an axial force generated on the joint when the joint is attached to a target portion.

According to the above arrangement, when the joint is tightened to be attached to the target portion, a compression force is generated due to an axial force generated on the joint. Since the bonding portion is located at the portion at which the compression force is generated, the connection between the joint and the sensor module at the bonding portion can be further strengthened and the air-tightness can be enhanced.

In the pressure sensor according to the above aspect of the invention, it is preferable that the joint includes an abutting surface to be in contact with the target portion when the joint is attached to the target portion, and the bonding portion is present in a plane defined by the abutting surface.

According to the above arrangement, when the joint is attached to the target portion, the abutting surface is in contact with the target portion. In this state, though a large compression force is generated on the joint coplanarly along the abutting surface, since the bonding portion is present in the plane defined by the abutting surface of the joint, the connection at the bonding portion between the joint and the sensor module can be strengthened and the air-tightness can be further enhanced.

In the pressure sensor according to the above aspect of the invention, it is preferable that the joint includes a male thread configured to be screwed into the target portion, and the abutting surface is defined near a proximal end of the male thread.

According to the above arrangement, in order to attach the joint to the target portion, the male thread is screwed into the target portion. A large stress is generated from the distal end to the proximal end of the male thread as the male thread is further deeply screwed. The stress is maximized when the abutting surface is in contact with the target portion, where a large compression force is generated coplanarly with the abutting surface from the outer circumference to the center of the joint.

Since the abutting surface is defined near the proximal end of the male thread, the compression force directed from the outer circumference to the center of the male thread is transmitted to the large-diameter portion via the bonding portion, so that the connection between the joint and the sensor module is further strengthened.

In the pressure sensor according to the above aspect of the invention, it is preferable that the first portion includes a module body including a cylindrical portion to which an outer peripheral portion of the diaphragm is bonded, the module body including a recess for the fluid to be measured to be introduced, the second portion includes an adapter comprising an end welded to an open end of the cylindrical portion and a hole configured to introduce the fluid to be measured to the recess of the module body, and a joint pipe is disposed in the recess of the module body and the hole of the adapter. According to the above arrangement, since the sensor module is a combination of independent components (i.e. the module body and the adapter), the production cost can be reduced by using an existing component as the module body.

BRIEF DESCRIPTION OF DRAWING(S)

DESCRIPTION OF EMBODIMENT(S)

Exemplary embodiment(s) of the invention will be described below with reference to the attached drawings.

Figure 1:
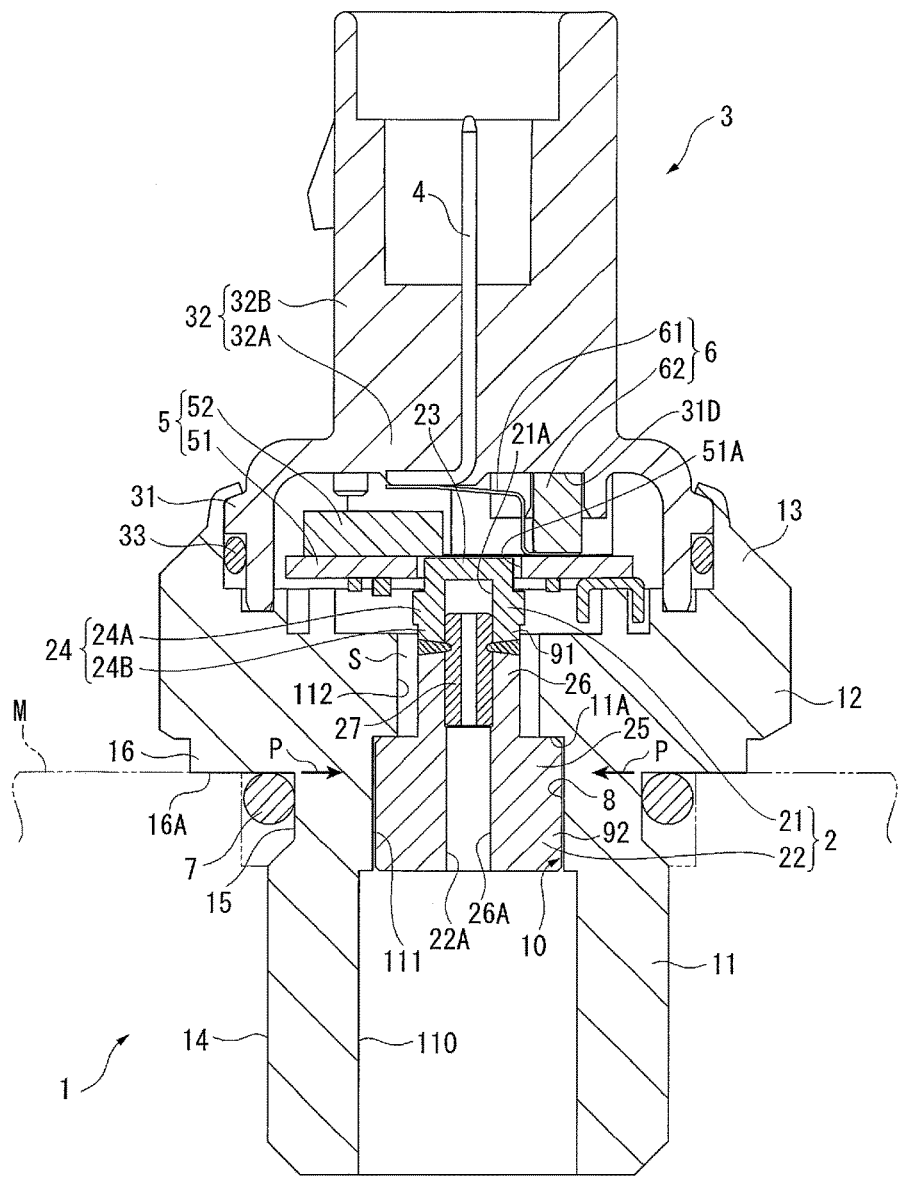
FIG. 1 is a cross section of a pressure sensor according to an exemplary embodiment of the invention.

FIG. 1 shows an overall arrangement of a pressure sensor according to the exemplary embodiment. The pressure sensor of the exemplary embodiment is used for, for instance, detecting a working pressure of hydraulic fluid and a hydraulic excavator.

As shown in FIG. 1, the pressure sensor includes: a joint 1; a sensor module 2 provided on the joint 1 and configured to detect a pressure of a fluid to be measured; a connector 3 provided to the joint 1; a terminal 4 provided to the connector 3; a circuit portion 5 configured to send to the terminal 4 signals indicating the pressure detected by the sensor module 2; and a connecting member 6 electrically connecting the circuit portion 5 to the terminal 4. The fluid to be measured in the exemplary embodiment includes liquid such as fuel (e.g. diesel engine fuel) and water, and gas (e.g. air).

The joint 1 is a metallic component including a shaft 11 defining an inner diameter portion 10; a flange 12 extending in a radial direction from a central portion of the shaft 11; and a sleeve 13 integrally provided to an outer peripheral portion of the flange 12.

A male thread 14 for screwing the pressure sensor into a target portion M is formed on an end of the shaft 11.

A recess 15 for receiving an O-ring 7 is provided to the shaft 11 between the male thread 14 and the flange 12. The recess 15 is positioned near a proximal end of the male thread 14. A step 16 is formed between the recess 15 and the flange 12. The step 16 defines an abutting surface 16A to be in contact with a flat face of the target portion M.

The inner diameter portion 10 includes: an introduction port 110 defined near a first end and configured to receive the fluid to be measured; a first inner diameter portion 111 defined at the center of the inner diameter portion 10 and bonded with the sensor module 2; and a second inner diameter portion 112 defined near a second end close to the circuit portion 5. The introduction port 110, the first inner diameter portion 111 and the second inner diameter portion 112 are coaxially provided. The inner diameter of the introduction port 110 is the largest, the inner diameter of the second inner diameter portion 112 is the smallest and the inner diameter of the first inner diameter portion 111 is between the inner diameters of the introduction port 110 and the second inner diameter portion 112.

A step 11A that is in a plane orthogonal to the axial direction is defined between the first inner diameter portion 111 and the second inner diameter portion 112.

The sensor module 2 includes: a module body 21 disposed near the connector 3; and an adapter 22 welded to the module body 21 and provided with an open end 22A through which the fluid to be measured is introduced. The module body 21 and the adapter 22 are made of the same material. The sensor module 2 is made of a metal material whose hardness is different from that of the joint 1. For instance, the joint 1 is made of steel, whereas the sensor module 2 is made of a stainless steel which is harder than the steel.

The module body 21 includes a diaphragm 23 displaceable in accordance with a pressure of the fluid to be measured and a cylindrical portion 24 connected to an outer peripheral portion of the diaphragm 23. The module body 21 defines a recess 21A into which the fluid to be measured is introduced.

A detector including a strain gauge (not shown) and the like is formed on the diaphragm 23. The signals detected by the detector are sent to the circuit portion 5 through a wire (not shown).

The cylindrical portion 24 includes a flanged portion 24A at the center thereof, and an open end portion 24B integrated with the flanged portion 24A. An outer diameter of the open end portion 24B is smaller than that of the flanged portion 24A.

The adapter 22 includes a large-diameter portion 25 bonded with the first inner diameter portion 111 through the bonding portion 8 and a small-diameter portion 26 whose outer diameter is smaller than that of the large-diameter portion 25. The adapter 22 defines a hole 26A for introducing the fluid to be measured into the recess 21A of the module body 21. A joint pipe 27 is disposed in the recess of the module body 21 and the hole 26A of the adapter 22 across a connected portion between the module body 21 and the adapter 22. The joint pipe 27 is made of the same metal material as that of the sensor module 2.

The small-diameter portion 26 has the same outer diameter as that of the open end portion 24B of the cylindrical portion 24. The outer circumferential surfaces of the small-diameter portion 26 and the open end portion 24B of the cylindrical portion 24 face the second inner diameter portion 112.

In the exemplary embodiment, the module body 21 and the small-diameter portion 26 of the adapter 22 define a first portion 91 of the sensor module 2 and the large-diameter portion 25 of the adapter 22 defines a second portion 92 of the sensor module 2. The step between the first inner diameter portion 111 and the introduction port 110 is flush with a flat face of the large-diameter portion 25 remote from the small-diameter portion 26.

A space S for preventing a stress caused on the joint 1 when the joint 1 and the large-diameter portion 25 are bonded from being transmitted to the diaphragm 23 is defined between outer walls of the module body 21 and the small-diameter portion 26, and the second inner diameter portion 112 of the joint 1.

The bonding portion 8 is formed between an outer circumferential portion of the large-diameter portion 25 and the first inner diameter portion 111 of the joint 1, where a part of the outer circumferential portion of the large-diameter portion 25 and an inner circumferential portion of the first inner diameter portion 111 bite into each other while causing local plastic deformation and elastic deformation pressure, and the elastic deformation pressure in the axial direction is trapped to keep the connection in the axial direction. In other words, the joint 1 and the large-diameter portion 25 are bonded by a plastic deformation bonding. The plastic deformation bonding is a bonding process sometimes called as "metal flow." It should be noted that groove(s) (not shown) is formed on the outer circumferential portion of the large-diameter portion 25.

A radial compression force P is generated by an axial force generated on the joint 1 when the joint 1 is attached to the target portion M. The bonding portion 8 is defined at the portion in which the compression force P is generated.

When the male thread 14 of the joint 1 is screwed into the target portion M, the abutting surface 16A of the joint 1 presses the flat face of the target portion M, so that the compression force P is applied to the joint 1 in a direction toward the axial center of the first inner diameter portion 111 in the same plane as the abutting surface 16A. Accordingly, the bonding portion 8 is disposed coplanarly with the abutting surface 16A, which is in contact with the target portion M, of the step 16 in the exemplary embodiment.

The connector 3 is a synthetic resin component including a ring-shaped base 31, and a body portion 32 integrated with the base 31 to support the terminal 4.

A sealing member 33 in a form of an O-ring is interposed between the base 31 and the joint 1.

The body portion 32 includes a plate portion 32A in which the terminal 4 is insert-molded, and a cylindrical portion 32B integrally molded on the plate portion 32A.

The terminal 4 is an L-shaped metal component, a proximal end of a first elongated portion defining the L-shape being buried in the plate portion 32A and a distal half of the L-shape being exposed to an interior space in the cylindrical portion 32B. A second elongated portion defining the L-shape of the terminal 4 faces the plate portion 32A.

The circuit portion 5 includes a circuit board 51 provided to the joint 1 and an electronic component 52 provided on the circuit board 51. The circuit board 51 is provided with an opening 51A for receiving the diaphragm 23.

The connecting member 6 includes an elastic electrically conductive member 61 having a first end electrically connected with the second elongated portion of the terminal 4 and a second end connected to the circuit board 51, and an elastic member 62 configured to bias the second end of the electrically conductive member 61 toward the sensor module 2.

The electrically conductive member 61 is a connecting fitting formed by bending a plate-shaped member. The elastic force of the connecting fitting biases the first end of the electrically conductive member 61 toward the terminal 4 and the second end of the electrically conductive member 61 toward the sensor module 2. The first end of the electrically conductive member 61 is welded with the terminal 4 through a resistance welding.

The elastic member 62 is a square-column cushion member made of silicone rubber. An end of the elastic member 62 is fitted into a recess 31D defined in the base 31 of the connector 3. The second end of the elastic member 62 is in contact with the second end of the electrically conductive member 61.

Next, a process for assembling the pressure sensor of the exemplary embodiment will be described below with reference to FIGS. 2A and 2B.

Initially, an assembling process of the sensor module 2 will be described with reference to FIG. 2A.

Figure 2A:
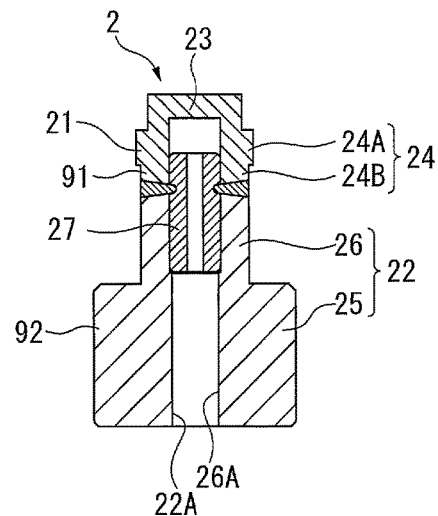
FIG. 2A is a cross section showing a process for assembling the pressure sensor.

As shown in FIG. 2A, the module body 21 and the adapter 22 are coaxially abutted with each other and the joint pipe 27 is disposed in the recess of the module body 21 and the hole 26A of the adapter 22. Then, the abutted portion of the module body 21 and the adapter 22 is welded using electron beam welding or the like.

Next, a process for bonding the sensor module 2 to the joint 1 will be described with reference to FIG. 2B.

Figure 2B:
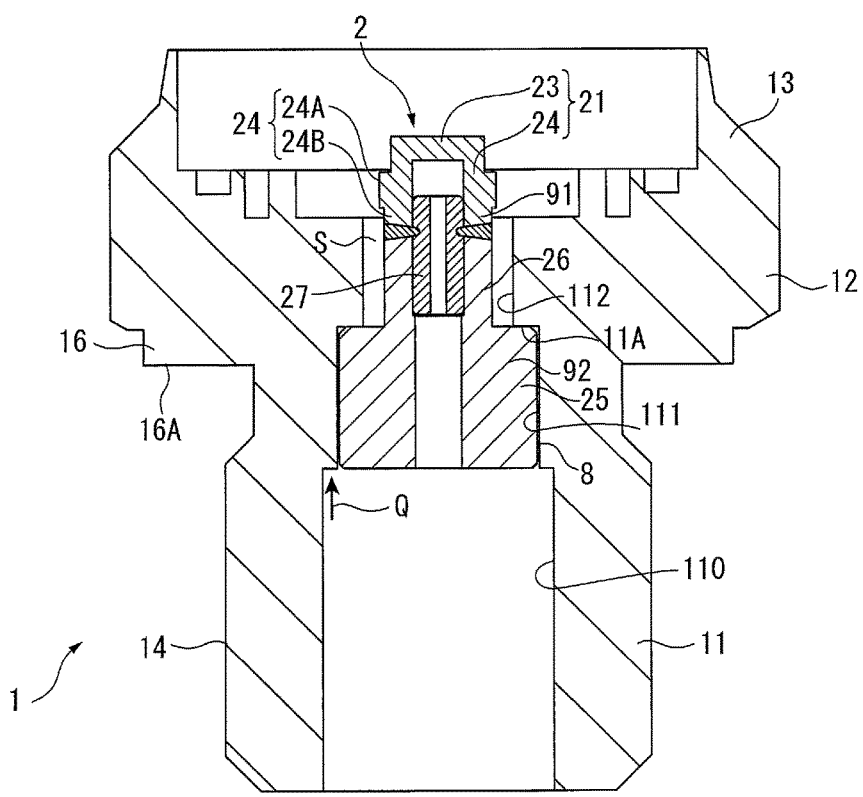
FIG. 2B is another cross section showing the process for assembling the pressure sensor.

As shown in FIG. 2B, the sensor module 2 is housed in the joint 1 so that a shoulder of the large-diameter portion 25 is brought into contact with the step 11A between the first inner diameter portion 111 and the second inner diameter portion 112. Then, a predetermined pressurizing force Q is applied to the step between the first inner diameter portion 111 and the introduction port 110 of the joint 1, or to a flat face of the large-diameter portion 25 using a punch or the like, thereby connecting the joint 1 and the sensor module 2 by the plastic deformation bonding. Specifically, the first inner diameter portion 111 of the joint 1 made of the material softer than the material of the sensor module 2 bites into the groove(s) (not shown) formed on the large-diameter portion 25 of the sensor module 2.

Though a stress generated on the joint 1 when the joint 1 and the large-diameter portion 25 are bonded tends to be transmitted toward the diaphragm 23, the stress is not transmitted thereto due to the presence of the space S.

After the sensor module 2 is attached to the joint 1, the circuit portion 5 is attached to the joint 1 and the connector 3 attached with the terminal 4 is attached to the joint 1. At this time, the connecting member 6 is disposed between the circuit portion 5 and the terminal 4.

Accordingly, the following advantages can be obtained by the exemplary embodiment.

(1) The pressure sensor includes the sensor module 2 and the joint 1 that are made of different metal materials, and the sensor module 2 includes the first portion 91 located near the diaphragm and the second portion 92 having the large-diameter portion 25 whose diameter is larger than that of the first portion 91. The joint 1 is provided with the step 11A with which the peripheral edge of the large-diameter portion 25 is engaged. The large-diameter portion 25 and the joint 1 are mutually bonded through the bonding portion 8. Since the bonding portion 8 is provided by the plastic deformation bonding (so-called "metal flow"), the air-tightness can be enhanced and the assembling process can be facilitated.

Further, since the space S is defined between the outer walls of the module body 21 and the small-diameter portion 26, and the second inner diameter portion 112 of the joint 1, a stress caused on the joint 1 when the joint 1 and the second portion 92 are bonded is prevented from being transmitted to the diaphragm 23. Accordingly, less strain is caused on the diaphragm 23 during the assembling of the pressure sensor. Thus, the accuracy deterioration of the pressure sensor can be reduced.

(2) Since the bonding portion 8 is disposed at the portion at which the radial compression force P is generated due to the axial force caused on the joint 1 when the joint 1 is attached to the target portion M, the connection between the joint 1 and the sensor module 2 at the bonding portion 8 can be tightened and the air-tightness can be enhanced.

(3) Since the joint 1 includes the abutting surface 16A that is in contact with the target portion M when the joint 1 is attached to the target portion M and the bonding portion 8 is present in the plane defined by the abutting surface 16A, the connection between the joint 1 and the sensor module 2 at the bonding portion 8 can be further tightened and the air-tightness can be further enhanced.

(4) Since the joint 1 includes the male thread 14 to be screwed into the target portion M and the abutting surface 16A is defined near the proximal end of the male thread 14, the compression force P applied from the outer circumferential portion toward the center of the male thread 14 is transmitted to the large-diameter portion 25 through the bonding portion 8, thereby further tightening the connection between the joint 1 and the sensor module 2.

(5) Since the sensor module 2 is a combination of the module body 21 and the adapter 22, the production cost can be reduced by using an existing component as the module body 21.

(6) The sensor module 2 includes the first portion 91 and the second portion 92 having a diameter larger than that of the first portion 91, where the first portion 91 includes not only the module body 21 but also the small-diameter portion 26 of the adapter 22. Accordingly, since the length of the first portion 91 and the space S in the axial direction can be increased, a stress caused when the joint 1 and the second portion 92 are bonded is reliably prevented from being transmitted to the diaphragm 23.

Incidentally, it should be understood that the scope of the present invention is not limited to the above-described exemplary embodiment(s) but includes modifications and improvements as long as the modifications and improvements are compatible with the invention.

For instance, though the sensor module 2 is a combination of the module body 21 and the adapter 22 in the exemplary embodiment, the sensor module 2 of the invention may be provided solely of the module body 21. In this arrangement, it is necessary for the sensor module 2 to be provided with the small-diameter portion 26 corresponding to the first portion 91 and the large-diameter portion 25 corresponding to the second portion 92.

When the sensor module 2 includes the adapter 22, the adapter 22 may define the large-diameter portion 25 and the module body 21 may define the small-diameter portion 26.

It is not always necessary in the invention that the joint 1 includes the male thread 14 to be screwed into the target portion M. For instance, the joint 1 may be attached to the target portion M using an attachment member.

Further, though the joint 1 in the exemplary embodiment includes the step 16, it is not always necessary to provide the step to the joint 1 in the invention. In other words, the step 16 may be omitted and the abutting surface 16A may be directly formed on the flange 12.

What is claimed is:

1. A pressure sensor comprising:
a sensor module comprising an open end through which a fluid to be measured is introduced, and a diaphragm displaceable in accordance with a pressure of the fluid to be measured introduced through the open end; and
a joint attached with the sensor module and comprising an introduction port through which the fluid to be measured is introduced to the sensor module, wherein
the sensor module and the joint are made of different metal materials,
the sensor module comprises: a first portion located near the diaphragm; and a second portion located near the open end and comprising a large-diameter portion having a diameter larger than a diameter of the first portion,
a step with which a peripheral edge of the large-diameter portion is engaged is provided to the joint,
the large-diameter portion is bonded to the joint through a bonding portion,
the bonding portion is formed between an outer circumferential portion of the large-diameter portion and the joint, where a part of the outer circumferential portion of the large-diameter portion and an inner circumferential portion of the joint bite into each other while causing a local plastic deformation and an elastic deformation pressure, and where the elastic deformation pressure in an axial direction is trapped at the bonding portion to keep a connection in the axial direction, and
a space configured to prevent a stress caused on the joint when the joint and the large-diameter portion are bonded from being transmitted to the diaphragm is provided between the joint and the first portion.

2. The pressure sensor according to claim 1, wherein the bonding portion is disposed at a portion at which a radial compression force is generated due to an axial force generated on the joint when the joint is attached to a target portion.

3. The pressure sensor according to claim 2, wherein the joint comprises an abutting surface to be in contact with the target portion when the joint is attached to the target portion, and
the bonding portion is present in a plane defined by the abutting surface.

4. The pressure sensor according to claim 3, wherein the joint comprises a male thread configured to be screwed into the target portion, and the abutting surface is defined near a proximal end of the male thread.

5. The pressure sensor according to claim 4, wherein the first portion comprises a module body comprising a cylindrical portion to which an outer peripheral portion of the diaphragm is bonded, the module body comprising a recess for the fluid to be measured to be introduced,
the second portion comprises an adapter comprising an end welded to an open end of the cylindrical portion and a hole configured to introduce the fluid to be measured to the recess of the module body, and
a joint pipe is disposed in the recess of the module body and the hole of the adapter.

* * * * *